US011358122B2

(12) United States Patent
Hyung et al.

(10) Patent No.: US 11,358,122 B2
(45) Date of Patent: Jun. 14, 2022

(54) MOISTURE ABSORBENT PACK FOR VEHICLE LAMP

(71) Applicant: DesiKhan Co., Ltd., Daejeon (KR)

(72) Inventors: Sin Jong Hyung, Daejeon (KR); Nak Cheon Choi, Sejong-si (KR); You Jin Lee, Daejeon (KR); Jong Hyup Kim, Seoul (KR)

(73) Assignee: DesiKhan Co., Ltd., Daejeon (KR)

( * ) Notice: Subject to any disclaimer, the term of this patent is extended or adjusted under 35 U.S.C. 154(b) by 398 days.

(21) Appl. No.: 16/427,725

(22) Filed: May 31, 2019

(65) Prior Publication Data

US 2020/0324271 A1 Oct. 15, 2020

(30) Foreign Application Priority Data

Apr. 10, 2019 (KR) .................. 10-2019-0042092
May 14, 2019 (KR) .................. 10-2019-0056032

(51) Int. Cl.

| *B01J 20/28* | (2006.01) |
|---|---|
| *F21S 45/50* | (2018.01) |
| *B01J 20/04* | (2006.01) |
| *B01J 20/26* | (2006.01) |
| *C08L 91/06* | (2006.01) |

(52) U.S. Cl.
CPC ......... *B01J 20/2805* (2013.01); *B01J 20/043* (2013.01); *B01J 20/045* (2013.01); *B01J 20/046* (2013.01); *B01J 20/048* (2013.01); *B01J 20/26* (2013.01); *F21S 45/50* (2018.01); *C08L 91/06* (2013.01)

(58) Field of Classification Search
CPC ...... B01J 20/28; B01J 20/2805; B01J 20/043; B01J 20/045; B01J 20/046; B01J 20/048; B01J 20/26; F21S 45/50; C08L 91/06
USPC ...................................................... 502/402
See application file for complete search history.

(56) References Cited

U.S. PATENT DOCUMENTS

| 7,803,880 B2 * | 9/2010 | Torii ................... B01J 20/261 525/329.7 |
|---|---|---|
| 2008/0200331 A1 * | 8/2008 | Daniel .................. A61L 15/60 502/402 |
| 2009/0215617 A1 * | 8/2009 | Kimura .................. C08L 33/02 502/402 |
| 2010/0184594 A1 * | 7/2010 | Riegel .................... A61L 15/42 502/402 |
| 2018/0353931 A1 | 12/2018 | Hyung et al. |
| 2019/0126234 A1 * | 5/2019 | Flaugher ................ B01J 20/18 |

FOREIGN PATENT DOCUMENTS

| JP | 11-329719 A | 11/1999 |
|---|---|---|
| JP | 2010-076826 A | 4/2010 |
| KR | 10-2012-0093059 A | 8/2012 |
| KR | 10-2013-0027402 A | 3/2013 |
| KR | 10-2015-0058825 A | 5/2015 |
| KR | 10-1760302 B1 | 7/2017 |
| KR | 10-1760304 B1 | 7/2017 |
| KR | 2018-0076049 A | 7/2018 |
| WO | 2014/157095 A1 | 10/2014 |

OTHER PUBLICATIONS

Office Action of corresponding Korean Patent Application 10-2019-0042092—5 pages (dated Sep. 27, 2020).
Extended European Search Report of corresponding European Patent Application No. 19177681.4—50 pages (Dec. 10, 2019).
XP002796123, Database WPI, Week 200015, Clarivate Analytics—7 pages (2017).

* cited by examiner

*Primary Examiner* — Edward M Johnson
(74) *Attorney, Agent, or Firm* — Knobbe Martens Olson & Bear LLP (57) ABSTRACT

A moisture absorbent for a vehicle lamp includes a first inorganic material, a second inorganic material, alkali metal phosphate, and a polymer wax are included. A composite moisture absorbent structure includes a first moisture absorbent pack including a powder type moisture absorbent and a second moisture absorbent pack including a capsule type moisture absorbent are embedded.

15 Claims, 3 Drawing Sheets

MOISTURE ABSORBENT PACK FOR VEHICLE LAMP

CROSS-REFERENCE TO RELATED APPLICATIONS

This application claims priority under 35 U.S.C. § 119 to Korean Patent Application No. 10-2019-0042092, filed on Apr. 10, 2019, and Korean Patent Application No. 10-2019-0056032, filed on May 14, 2019, in the Korean Intellectual Property Office, the disclosure of which is incorporated herein by reference in its entirety.

TECHNICAL FIELD

The following disclosure relates to a moisture absorbent pack for a vehicle lamp having an improved durability.

BACKGROUND

In accordance with the development of a vehicle industry, a condensation problem on a headlamp, a rear lamp, a fog lamp, and the like continuously occurs during storage and traveling of a vehicle, which has caused an increase in industrial losses.

In a vehicle lamp, a large temperature difference between inside and outside parts may occur in a high humidity environment such as in the rain. In this case, when a temperature of a lamp lens is low, moisture inside a lamp is condensed and an inner surface of the lens fogs up due to formation of fine water drops on the inner surface of the lens. As a result, a light scattering phenomenon is generated, which is a serious obstacle to safe driving of a vehicle.

Accordingly, it may be required to avoid, minimize or prevent an occurrence of condensation in the vehicle lamp by absorbing moisture inside the lamp in response to various external environments. Korean Patent Laid-Open Publication No. 10-2015-0058825 (2015 May 29) discloses the related technology.

SUMMARY

An embodiment of the present invention is directed to providing a moisture absorbent pack in which a moisture absorbent which has a high absorbency and release resistance and effectively controls humidity in an internal environment when using, is sealed and a composite moisture absorbent structure including the same.

Another embodiment of the present invention is directed to providing a moisture absorbent pack in which a moisture absorbent capable of improving sustainability of moisture absorbency effectively and a composite moisture absorbent structure including the same.

Still another embodiment of the present invention is directed to providing a moisture absorbent pack in which a moisture absorbent capable of significantly reducing an expansion rate after moisture absorption according to moisture absorption and a composite moisture absorbent structure including the same.

Still another embodiment of the present invention is directed to providing a sustained-release composite moisture absorbent structure capable of efficiently controlling a moisture absorption speed and efficiently controlling humidity at a level at which condensation does not occur.

Still another embodiment of the present invention is directed to providing a sustained-release composite moisture absorbent structure capable of efficiently controlling humidity in a vehicle lamp at a level at which condensation does not occur in a case where a first moisture absorbent pack and a second moisture absorbent pack are particularly embedded in a vehicle lamp.

In one general aspect, a moisture absorbent includes: a) one or two or more first inorganic materials selected from the group consisting of magnesium chloride, calcium chloride, and sodium carbonate; b) one or two or more second inorganic materials selected from the group consisting of magnesium oxide and calcium oxide; c) alkali metal phosphate; and d) one or two or more polymer waxes selected from the group consisting of polyethylene wax, polypropylene wax, polyamide wax, carnauba wax, paraffin wax, and polytetrafluoroethylene wax.

The alkali metal phosphate may include one or two or more selected from the group consisting of monosodium phosphate, disodium phosphate, and trisodium phosphate.

The moisture absorbent may include 10 to 70 wt % of the first inorganic material, 5 to 50 wt % of the second inorganic material, 1 to 30 wt % of the alkali metal phosphate, and 1 to 30 wt % of the polymer wax, with respect to a total weight of the moisture absorbent.

In another general aspect, there is provided a moisture absorbent pack for a vehicle lamp in which the moisture absorbent is sealed in an air permeable packaging material.

The air permeable packaging material may include an air permeable film layer and a sealing layer formed on one surface or opposite surfaces of the air permeable film layer, the air permeable film layer being formed of one or two or more fibers selected from a natural fiber, polyester, polyethylene, polypropylene, polyamide, a cellulose-based fiber, an acrylic fiber, and a rayon-based fiber.

The moisture absorbent pack may maintain 60% or less of a relative humidity for 55 days or longer under constant temperature and humidity conditions of 40° C. and 90%.

In still another general aspect, there is provided a composite moisture absorbent structure in which a first moisture absorbent pack including a powder type moisture absorbent and a second moisture absorbent pack including a capsule type moisture absorbent are embedded, wherein the powder type moisture absorbent is formed of a moisture absorbent including: one or two or more first inorganic materials selected from the group consisting of magnesium chloride, calcium chloride, and sodium carbonate; one or two or more second inorganic materials selected from the group consisting of magnesium oxide and calcium oxide; alkali metal phosphate; and a polymer wax, and the capsule type moisture absorbent includes a moisture absorbent which is the same as or different from the moisture absorbent and filled in a capsule including a water-soluble polymer.

The first moisture absorbent pack may include the powder type moisture absorbent and the second moisture absorbent pack may include the capsule type moisture absorbent, the powder type moisture absorbent and the capsule type moisture absorbent being sealed in an air permeable packaging material.

A moisture absorption rate may be 0.5 to 15% when the capsule type moisture absorbent is measured under a temperature of 50° C. and a relative humidity of 95% for 2 hours.

The water-soluble polymer may be one or a mixture of two or more selected from gelatin, starch, polyvinyl alcohol, polyethyleneimine, polyvinylpyrrolidone, polyalkylene oxide, cellulose ether, carboxymethylcellulose, dextrin, methylcellulose, ethylcellulose, hydroxyethylcellulose, hydroxypropylmethylcellulose, a salt thereof, and a copolymer thereof.

The capsule type moisture absorbent may include a moisture absorbent including one or a mixture of two or more selected from a third inorganic material, a fourth inorganic material, alkali metal phosphate, and a polymer additive and filled in the capsule including the water-soluble polymer.

The third inorganic material may include one or two or more selected from the group consisting of magnesium chloride, calcium chloride, sodium carbonate, sodium phosphate, sodium bicarbonate, sodium citrate, sodium oxalate, and sodium sulfate, and the fourth inorganic material may include one or two or more selected from the group consisting of magnesium oxide and calcium oxide.

The composite moisture absorbent structure may be for a vehicle lamp.

DETAILED DESCRIPTION OF EMBODIMENTS

Hereinafter, a moisture absorbent pack for a vehicle lamp having an improved durability will be described in detail. However, the following embodiments are only one reference example for describing the present invention in detail, and the present invention is not limited thereto and may be implemented in various forms.

Unless otherwise defined, all terms of technical and scientific terms used herein have the same meaning as commonly understood by a person skilled in the art to which the present invention belongs. Terms used in the present disclosure are used only in order to describe an embodiment rather than limiting the present invention.

In addition, drawings to be provided below are provided by way of example so that the spirit of the present invention may be sufficiently transferred to those skilled in the art. Therefore, the present invention is not limited to the accompanying drawings provided below, but may be modified in many different forms. In addition, the accompanying drawings suggested below will be exaggerated in order to clear the spirit and scope of the present invention. In addition, the same reference numerals denote the same elements throughout the specification.

In addition, singular forms used in the specification and the appended claims may be intended to include plural forms unless interpreted otherwise in context.

The term "moisture absorbency" used herein, means the property of an active ingredient absorbing or adsorbing water from the air or surrounding atmosphere. The property of moisture absorbency includes deliquescence which means the property of absorbing or adsorbing water to the extent that a moisture absorbent material becomes a liquid.

In one implementation of moisture absorbency, a method of using an anti-fog coating agent or mounting a bentonite-based moisture absorbent in a lamp housing is used. However, in the case of the anti-fog coating agent, deterioration such as a whitening or flowing phenomenon may occur due to ultraviolet lays, a temperature, humidity, and the like. In this case, a vehicle lamp module may be required to be replaced. In addition, the bentonite-based moisture absorbent re-releases moisture in a high temperature and low humidity environment when the lamp is operated after absorbing a certain amount of moisture, which causes condensation on the inner surface of the lamp lens. This leads to a functional quality deterioration of the vehicle lamp. As a result, costs for replacing the vehicle lamp module are incurred.

Moreover, it takes a certain period of time for a vehicle to be delivered after mass production and a lamp is often replaced due to, e.g., condensation in the lamp within the warranty period after the vehicle is delivered to a customer. The reason for the foregoing is that moisture absorbency of a moisture absorbent mounted in the lamp is not secured for a long period of time.

In addition, a moisture absorbent mounted in a vehicle lamp has a high initial moisture absorbency, but the moisture absorbency thereof is likely to be rapidly reduced over time. Therefore, humidity control performance is reduced due to moisture absorption when moisture absorption reaches a saturation level. In particular, in a case where the moisture absorbent absorbs moisture at once at an early stage of implementing moisture absorbency, performance duration may be shortened. Thus, it may be required to control moisture absorbency so as to implement moisture absorbency for a long period of time.

Accordingly, it may be required for a moisture absorbent to have a new function by which moisture is efficiently absorbed in a vehicle lamp in response to various external environments and release of moisture is minimized, such that condensation is prevented by controlling humidity.

Meanwhile, a dust cover which has a limited space may be damaged or deformed due to volume expansion or curing characteristics of a moisture absorbent. Contents of the moisture absorbent may be leaked outside when a packaging material of a product containing the moisture absorbent is damaged.

In order to address the foregoing, there may be a need for a moisture absorbent having significantly improving moisture absorbency and reducing an expansion phenomenon after absorbing. In addition, it is urgent to develop a technology for a moisture absorbent having sustainable moisture absorbency by which a humidity control function of the moisture absorbent may be secured for a long period of time by controlling the amount of moisture absorption in a vehicle lamp at a level at which condensation does not occur.

In a case of a typical moisture absorbent, although moisture absorbency is implemented, additional damages occur due to expansion according to moisture absorption, and since moisture absorbency is not maintained when used for a long period of time, a use period is limited.

In view of the foregoing, the inventors of the present invention found a moisture absorbent pack capable of further improving moisture absorbency, significantly reducing an expansion rate according to moisture absorption, and securing durability, thereby completing the present invention.

Embodiments of the present invention will be described in detail as follows.

A moisture absorbent according to embodiments of the present invention includes: a) one or two or more first inorganic materials selected from the group consisting of magnesium chloride, calcium chloride, and sodium carbonate; b) one or two or more second inorganic materials selected from the group consisting of magnesium oxide and calcium oxide; c) alkali metal phosphate; and d) one or two or more polymer waxes selected from the group consisting of polyethylene wax, polypropylene wax, polyamide wax, carnauba wax, paraffin wax, and polytetrafluoroethylene wax.

In the moisture absorbent according to embodiments of the present invention, moisture absorbency and release resistance are significantly excellent and, when mounted in a device, damage caused by a leakage of contents or a limited space is prevented by suppressing a physical expansion after moisture absorption, such that the moisture absorbent has excellent stability.

According to an embodiment of the present invention, the first inorganic material may include one or two or more selected from the group consisting of magnesium chloride, calcium chloride, and sodium carbonate. Preferably, it is more effective to include magnesium chloride in terms of improvement in moisture absorbency and release resistance.

In a case of including the first inorganic material, when the first inorganic material is mixed with the second inorganic material, the alkali metal phosphate, and the polymer wax, moisture absorbency may be significantly improved, and the moisture absorbent may be prevented from being liquefied due to excessive moisture absorption, such that reliability for product stability may be secured.

According to an embodiment of the present invention, 10 to wt % of the first inorganic material may be included with respect to the total weight of the moisture absorbent. 20 to 60 wt % of the first inorganic material may be preferably included, and in another example, 30 to 55 wt % of the first inorganic material may be included, with respect to the total weight of the moisture absorbent. In a case where the first inorganic material is included in the above-mentioned content, stability may be secured and excellent moisture absorbency and release resistance may be implemented.

According to an embodiment of the present invention, the second inorganic material may include one or two or more selected from the group consisting of magnesium oxide and calcium oxide. In a case of including the second inorganic material, when the second inorganic material is mixed with the first inorganic material, the alkali metal phosphate, and the polymer wax, the moisture absorbent may be prevented from being liquefied due to deliquescence after moisture absorption.

Specifically, the second inorganic material may be preferably magnesium oxide, for example, STARMAG 50 manufactured by KONOSHIMA CHEMICAL Co., Ltd. may be used, but is not limited thereto.

According to an embodiment of the present invention, 5 to wt % of the second inorganic material may be included with respect to the total weight of the moisture absorbent. 10 to 50 wt % of the second inorganic material may be preferably included, and in another example, 15 to 40 wt % of the second inorganic material may be included, with respect to the total weight of the moisture absorbent. In a case where the second inorganic material is included in the above-mentioned content, it is more effective to improve miscibility between components in the moisture absorbent and to suppress separation between the components while securing sustainability of moisture absorbency for a long period of time.

According to an embodiment of the present invention, an average particle size of the second inorganic materials may be 1 to 500 μm, and preferably 10 to 400 μm.

According to an embodiment of the present invention, the second inorganic material may include a mixture of a second inorganic material a having an average particle size of 1 to 150 μm and a second inorganic material b having an average particle size of 200 to 500 μm. Preferably, the second inorganic material may include a mixture of a second inorganic material a having an average particle size of 1 to 100 μm and a second inorganic material b having an average particle size of 200 to 400 μm. By including the second inorganic materials having different average particle sizes as described above, moisture absorbency and release resistance may be further improved and an expansion rate according to moisture absorption is significantly reduced, such that stability of the moisture absorbent may be effectively secured. As a specific embodiment, the second inorganic material a may be light-burned and the second inorganic material b may be dead-burned, but the present invention is not limited thereto.

In order to significantly improve the effects described above, in one example, in the second inorganic material, an average particle size ratio of the second inorganic material a ($IO_a$) to the second inorganic material b ($IO_b$) may be 0.001 to 0.75:1, preferably 0.01 to 0.5:1, and in another example, 0.05 to 0.2:1.

According to an embodiment of the present invention, the alkali metal phosphate may include alkali metal ions selected from lithium, sodium, potassium, and the like. Preferably, the alkali metal phosphate may be alkali metal phosphate including sodium metal ions. As a specific example, the alkali metal phosphate may include one or two or more selected from the group consisting of monosodium phosphate, disodium phosphate, and trisodium phosphate, but is not limited thereto.

In a case of including the alkali metal phosphate, when the alkali metal phosphate is mixed with the first inorganic material, the second inorganic material, and the polymer wax, it is possible to efficiently suppress expansion caused by moisture absorption, and humidity control performance may be excellent under a high humidity condition, such that durability by which a moisture absorption effect is implemented for a long period of time may be secured.

According to an embodiment of the present invention, 1 to wt % of the alkali metal phosphate may be included with respect to the total weight of the moisture absorbent. 2 to 25 wt % of the alkali metal phosphate may be preferably included, and in another example, 5 to 25 wt % of the alkali metal phosphate may be included, with respect to the total weight of the moisture absorbent. In a case where the alkali metal phosphate is included in the above-mentioned content, the expansion rate of the moisture absorbent may be more decreased when absorbing moisture. Therefore, damage of a moisture absorbent pack in which the moisture absorbent is sealed and a leakage of contents are more effectively prevented.

According to an embodiment of the present invention, the polymer wax may include one or two or more selected from the group consisting of polyethylene wax, polypropylene wax, polyamide wax, carnauba wax, paraffin wax, and polytetrafluoroethylene wax. In a case of including the polymer wax, when the polymer wax is mixed with the first inorganic material, the second inorganic material, and the alkali metal phosphate, the polymer wax may be changed to a liquid having a high viscosity depending on a temperature change such as an increase in a temperature inside a vehicle lamp or an increase in an environmental temperature of the moisture absorbent, such that a release of absorbed moisture is suppressed, and may serve to adjust a moisture absorption rate of the product as well.

According to an embodiment of the present invention, 1 to 40 wt % of the polymer wax may be included with respect to the total weight of the moisture absorbent. 5 to 30 wt % of the polymer wax may be preferably included, and in another example, 5 to 20 wt % of the polymer wax may be included, with respect to the total weight of the moisture absorbent. In a case where the polymer wax is included in the above-mentioned content, release resistance of the absorbed moisture may be improved and the moisture absorption rate and a moisture absorption speed may also be increased, which is effective in excellent moisture absorption sustainability.

According to an embodiment of the present invention, the moisture absorbent includes all the first inorganic material, the second inorganic material, the alkali metal phosphate, and the polymer wax, such that a moisture absorption rate is increased and excellent humidity control performance is implemented under an environment where humidity control may be required, and in particular, under an extremely humidity environment. Therefore, sustainable moisture absorbency may be secured. Further, it is more effective to secure stability for preventing additional damage due to expansion caused by moisture absorption.

According to an embodiment of the present invention, the moisture absorbent may further include an anionic polymer including one or two or more functional groups selected from a carboxyl group, and a hydroxyl group. As a specific example, the moisture absorbent may further include one or two or more polymer additives selected from the group consisting of alginate, carrageenan, gelatin, hyaluronic acid, polyacrylic acid, polyacrylate, polymethacrylic acid, polymethacrylate, starch, oxidized starch, cellulose, and carboxymethylcellulose, but is not limited thereto. In addition, the moisture absorbent may further include a coagulant such as A101, NAP701, or the like, but is not limited thereto.

According to an embodiment of the present invention, the moisture absorbent may include 0.1 to 10 parts by weight of the anionic polymer, and may preferably include 0.01 to 5 parts by weight of the anionic polymer, with respect to 100 parts by weight of total amount of the first inorganic material, the second inorganic material, the alkali metal phosphate, and the polymer wax, but is not limited thereto. Preferably, 0.01 to 5 parts by weight of the anionic polymer may be included, but is not limited thereto. In a case where the anionic polymer is included in the above-mentioned content, it is possible to further improve moisture absorbency, stable solidification of the internal materials after moisture absorption, and expansion suppression efficiency.

The moisture absorbent according to embodiments of the present invention is effectively implemented particularly when applied to a vehicle lamp. Specifically, the moisture absorbent has excellent moisture absorbency in a vehicle lamp, has stably excellent release resistance by which absorbed moisture is not released in a driving environment, and may be effectively used for a vehicle lamp such as a headlamp, a rear lamp, a fog lamp, or the like, but the application range thereof is not limited thereto.

According to an embodiment of the present invention, the moisture absorbent may be provided in various types of moisture absorbent packs for prevention of condensation or moisture removal. Specifically, according to an embodiment of the present invention, the moisture absorbent pack may be provided by putting the moisture absorbent into an air permeable bag, a container, a sack, a packaging material, or the like. Preferably, the moisture absorbent may be sealed in an air permeable packaging material.

According to an embodiment of the present invention, the moisture absorbent may be preferably a moisture absorbent pack sealed in an air permeable packaging material. In particular, the moisture absorbent pack is excellent to be used as a moisture absorbent pack for a vehicle lamp.

According to an embodiment of the present invention, a shape or a size of the air permeable packaging material is not particularly limited, but the air permeable packaging material may be appropriately designed depending on the purpose. Preferably, the moisture absorbent pack may be a moisture absorbent pack obtained by putting the moisture absorbent into an air permeable packaging material and heat-sealing the air permeable packaging material.

According to an embodiment of the present invention, as for a shape of the air permeable packaging material, those known to a person skilled in the art by Korean Patent Laid-Open Publication No. 10-2013-0027402, Korean Patent Laid-Open Publication No. 10-2012-0093059, Japanese Patent Laid-Open Publication No. 2010-076826, and the like, may be suitably used, but is not limited thereto. For example, two air permeable packaging materials cut into a desired shape are set to face each other and the moisture absorbent may be disposed between the two air permeable packaging materials facing each other.

According to an embodiment of the present invention, the air permeable packaging material may be a single layer or a laminate having two or layers.

According to an embodiment of the present invention, the air permeable packaging material may have a double-layer structure including an air permeable film layer and a sealing layer formed on one surface or opposite surfaces of the air permeable film layer. The moisture absorbent is included in the air permeable packaging material having the double-layer structure as described above, such that damage due to expansion may be further prevented and the absorbed moisture may be further prevented from being re-released.

According to an embodiment of the present invention, the air permeable film layer may be formed of one or two or fibers selected from a natural fiber, polyester, polyethylene, polypropylene, polyamide, a cellulose-based fiber, an acrylic fiber, a rayon-based fiber, and the like.

As a specific example, the air permeable film layer may be formed of at least one selected from the group consisting of Tyvek, polypropylene (PP) non-woven fabric, polyethylene (PE) non-woven fabric, polyethylene terephthalate (PET) non-woven fabric, a craft sheet, paper, and cloth, but is not limited thereto. The air permeable film layer may be formed of Tyvek in terms of securing of heat resistance of the air permeable packaging material.

According to an embodiment of the present invention, the sealing layer may be obtained by applying a coating solution containing a synthetic latex, an ethylene-vinyl acetate (EVA) copolymer, a solvent, an additive, and the like on the air permeable film layer, but is not limited thereto.

According to an embodiment of the present invention, the synthetic latex may be, for example, one or a mixture of two or more selected from an acrylic latex adhesive, an acrylic latex resin, and the like, but is not limited thereto.

According to an embodiment of the present invention, the coating solution may be a hot-melt adhesive containing the ethylene-vinyl acetate copolymer. The ethylene-vinyl acetate copolymer is a polymer produced by a copolymerization reaction between ethylene and vinyl acetate. As an example, the ethylene-vinyl acetate copolymer may include 50 to 97 wt % of ethylene and 3 to 50 wt % of vinyl acetate, but is not limited thereto.

According to an embodiment of the present invention, the additive may include one or two or more selected from a curing agent, an inorganic filler, a resin, and the like. As a specific example, the curing agent may be at least one selected from the group consisting of an amine-based curing agent, an acid anhydride-based curing agent, a phenol-based curing agent, and a dicyandiamide-based curing agent. The inorganic filler may be at least one selected from the group consisting of calcium carbonate, magnesium carbonate, talc, mica, kaolin, graphite, and silica. The resin may be at least one selected from the group consisting of a terpene phenol resin, a hydrogenated rosin resin, a petroleum resin, a xylene resin, and a coumarone resin, but is not limited thereto.

According to an embodiment of the present invention, the solvent may be at least one selected from the group consisting of toluene, acetone, and methyl ethyl ketone, but is not limited thereto.

Preferably, the sealing layer may be obtained by applying a coating solution on the air permeable film layer, the coating solution containing 15 to 50 wt % of a synthetic latex, 2 to 10 wt % of an ethylene-vinyl acetate copolymer, 40 to 80 wt % of a solvent, and 1 to 5 wt % of an additive. A drying process may be performed after applying the coating solution, if necessary, but is not limited thereto.

According to an embodiment of the present invention, a thickness of the sealing layer may be 3 to 20 μm and preferably 3 to 10 μm. In a case where the sealing layer is formed in the above-mentioned range of thickness, strength of the air permeable packaging material may be enhanced, contamination of a roller unit may be prevented when processing, and permeability may be increased.

According to an embodiment of the present invention, the moisture absorbent pack has excellent moisture absorption, such that the moisture absorbent pack may maintain a relative humidity of 60% or less for 55 days or longer under a constant temperature and humidity condition of 40° C. and a relative humidity of 90% or more. The moisture absorbent pack may preferably maintain a relative humidity of 60% or less for 60 days or longer, and in another example, 70 days or longer, in a thermo-hygrostat at 40° C. and a relative humidity of 90%.

According to an embodiment of the present invention, the measured moisture absorption rate of the moisture absorbent pack may be 100% or more, when the moisture absorbent pack is exposed in a thermo-hygrostat at 30° C. and a relative humidity of 80% for days. Specifically, the moisture absorption rate of the moisture absorbent pack may be 100 to 200% and preferably 140 to 200%.

By including the excellent moisture absorption as described above, in the present moisture absorbent, moisture absorbency may be maintained for a long period of time and a significantly increased moisture absorption rate may be realized as compared to a typical moisture absorbent.

According to an embodiment of the present invention, an increase rate in the expansion rate of the moisture absorbent may be 80% or less, specifically 20 to 80%, preferably 20 to 70%, and in another example, 20 to 60%, as compared to an initial volume, when the moisture absorbent pack is exposed in a thermo-hygrostat at 30° C. and a relative humidity of 80% for 21 days. Although the moisture absorbent contains moisture through moisture absorption as described above and absorbs a large amount of moisture, it is possible to achieve a significantly low expansion rate by including all components according to embodiments of the present invention.

According to an embodiment of the present invention, the moisture absorbent pack may further implement moisture absorption, release resistance, and expansion suppression more stably in a driving environment of a vehicle lamp, and in particular, has excellent durability, such that the moisture absorbent pack may be effectively used for a vehicle lamp such as a headlamp, a rear lamp, a fog lamp, or the like.

According to another embodiment of the present invention, there is provided a method of controlling humidity inside a vehicle lamp through the moisture absorbent pack described above. As an example, a method in which the moisture absorbent pack according to embodiments of the present invention is mounted in a vehicle lamp and humidity in the lamp is controlled by inducing moisture absorption may be used, and specifically, a method in which the moisture absorbent pack according to embodiments of the present invention is mounted in a dust cover provided in a vehicle lamp and humidity in a device is controlled may be used, such that condensation may be suppressed.

A typical moisture absorbent might have a high initial moisture absorption rate due to excellent initial moisture absorbency, however, the moisture absorption rate thereof is likely to be significantly reduced over time. The reason is that when moisture almost reaches a saturation level as the moisture absorbent performs moisture absorption, the moisture absorbency deteriorates. Accordingly, it may be required to delay a saturation point of the moisture absorption pack in order to maintain moisture absorbency for a long period of time. Particularly, it is important to implement excellent moisture absorbency for a long period of time.

To this end, the present inventors of the present invention found a composite moisture absorbent structure capable of maintaining humidity control performance for a long period of time in a device by limitedly controlling the amount of moisture to be absorbed at a level at which condensation does not occur and improving sustainability of moisture absorbency, thereby completing still another embodiment of the invention.

According to still another embodiment of the present invention, there is provided a composite moisture absorbent structure in which a first moisture absorbent pack including a powder type moisture absorbent and a second moisture absorbent pack including a capsule type moisture absorbent are embedded, the powder type moisture absorbent is formed of the moisture absorbent described above, and the capsule type moisture absorbent includes a moisture absorbent which is the same as or different from the moisture absorbent described above and filled in a capsule including a water-soluble polymer.

Specifically, the composite moisture absorbent structure according to embodiments of the present invention is a composite moisture absorbent structure in which a first moisture absorbent pack including a powder type moisture absorbent and a second moisture absorbent pack including a capsule type moisture absorbent are embedded, the powder type moisture absorbent is formed of a moisture absorbent including: one or two or more first inorganic materials selected from the group consisting of magnesium chloride, calcium chloride, and sodium carbonate; one or two or more second inorganic materials selected from the group consisting of magnesium oxide and calcium oxide; alkali metal phosphate; and a polymer wax, and the capsule type moisture absorbent includes a moisture absorbent which is the same as or different from the moisture absorbent described above and filled in a capsule including a water-soluble polymer.

In the composite moisture absorbent structure according to embodiments of the present invention, a first moisture absorbent pack including a powder type moisture absorbent and a second moisture absorbent pack including a capsule type moisture absorbent are embedded. By having such a configuration as described above, the composite moisture absorbent structure may implement excellent moisture absorption capable of preventing condensation in a vehicle lamp particularly and may implement a high moisture absorption for long period of time. Therefore, a use period of the vehicle lamp may be extended and durability of the vehicle lamp may be secured.

According to an embodiment of the present invention, the composite moisture absorbent structure may mean various types of products in which the first moisture absorbent pack and the second moisture absorbent pack are embedded. Specifically, the composite moisture absorbent structure may be a product mounted in a vehicle lamp such as a headlamp, a rear lamp, a fog lamp, and the like of a vehicle, may be a product such as a moisture absorbent pack, a moisture absorbent cloth, or the like packed by a packaging material or the like, and may be a composite moisture absorbent product including a first moisture absorbent pack and a second moisture absorbent pack.

The first moisture absorbent pack according to embodiments of the present invention may include a power type moisture absorbent including: one or two or more first inorganic materials selected from the group consisting of magnesium chloride, calcium chloride, and sodium carbonate; one or two or more second inorganic materials selected from the group consisting of magnesium oxide and calcium oxide; alkali metal phosphate; and a polymer wax.

According to an embodiment of the present invention, since the moisture absorbent is the same as described above, a description of the same contents will be omitted.

In the first moisture absorbent pack according to embodiments of the present invention, moisture absorbency and release resistance are significantly excellent and damage caused by a leakage of contents of the composite moisture absorbent structure in which the first moisture absorbent pack is embedded or a limited space is prevented by suppressing a physical expansion after moisture absorption, such that the moisture absorbent has excellent stability. In particular, the first moisture absorbent pack is included in the composite moisture absorbent structure together with the second moisture absorbent pack, such that it is possible to implement excellent moisture absorbency by which condensation is prevented in the composite moisture absorbent structure and to implement a high moisture absorbency for a long period of time.

In particular, the composite moisture absorbent structure according to embodiments of the present invention has stably excellent release resistance by which absorbed moisture is not released in a driving environment when applied to a vehicle lamp. Therefore, the composite moisture absorbent structure may be effectively used for a vehicle lamp such as a headlamp, a rear lamp, a fog lamp, and the like of a vehicle, but is not limited thereto.

According to an embodiment of the present invention, in the first moisture absorbent pack, a powder type moisture absorbent may be sealed in an air permeable packaging material. In addition, in the second moisture absorbent pack, a capsule type moisture absorbent may also be sealed in an air permeable packaging material. The first moisture absorbent pack and the second moisture absorbent pack are sealed in the air permeable packaging material as described above, such that moisture absorbency for moisture in the lamp while implementing air permeability that allows moisture to flow in and out. The air permeable packaging material is the same as described in the moisture absorbent pack.

Specifically, as an example, the second moisture absorbent pack includes a capsule type moisture absorbent including a moisture absorbent filled in a capsule including a water-soluble polymer. The second moisture absorbent pack including the capsule type moisture absorbent is used together with the first moisture absorbent pack, such that the amount of moisture to be absorbed in the composite moisture absorbent structure may be controlled at a level at which condensation does not occur and humidity control performance may be implemented for a long period of time by sustainably implementing excellent moisture absorbency.

According to an embodiment of the present invention, the capsule type moisture absorbent has a capsule shape in which a body and a cap are coupled to each other and is obtained by coupling a body which is a capsule outer layer including a water-soluble polymer and a cap to each other, and filling a moisture absorbent in a capsule.

According to an embodiment of the present invention, the capsule outer layer may have air permeability that allows moisture to flow in and out. Means for implementing the air permeability is not particularly limited, however, as an example, fine pin holes may be formed when molding a capsule or fine pores may be formed itself.

According to an embodiment of the present invention, the capsule outer layer may have moisture permeability of 40 to 400 $g/m^2 \cdot 24$ hr, preferably 50 to 350 $g/m^2 \cdot 24$ hr, and in another example, to 300 $g/m^2 \cdot 24$ hr as measured according to KS K0594 of the standard calcium chloride method. Sustainability of moisture absorbency may be further improved by satisfying the moisture permeability within the range described above.

In order to implement the air permeability as described above, the capsule outer layer of the capsule type moisture absorbent may include a water-soluble polymer and the water-soluble polymer may be thermoformable. As a specific example, the water-soluble polymer may be one or a mixture of two or more selected from gelatin, starch, polyvinyl alcohol, polyethyleneimine, polyvinylpyrrolidone, polyalkylene oxide, cellulose ether, carboxymethylcellulose, dextrin, methylcellulose, ethylcellulose, hydroxyethylcellulose, hydroxypropylmethylcellulose, a salt thereof, a copolymer thereof, and the like. In embodiments, the water-soluble polymer may necessarily include gelatin.

In addition, the capsule outer layer may include one or two or more selected from a polyhydric alcohol selected from glycerin, sorbitol, maltitol, and the like, alginate salt, sugar, dextrin, glycerin, gum arabic, agar, and the like, but is not limited thereto.

According to an embodiment of the present invention, the capsule outer layer of the capsule type moisture absorbent may be a hard capsule or a soft capsule depending on the surface property thereof. Preferably, the capsule outer layer may be a soft capsule outer layer so as to implement air permeability, specifically, as an example, the soft capsule outer layer may include a polyhydric alcohol selected from glycerin, sorbitol, maltitol, and the like, gum arabic, polyvinyl alcohol, agar, and the like, other than gelatin, but is not limited thereto. Preferably, in a case where a polyhydric alcohol selected from glycerin, sorbitol, maltitol, and the like is further added to gelatin, it is effective in solubility and humidity control by moisture absorption.

As an example, the capsule outer layer may be manufactured by including 30 to 300 parts by weight of water and to 50 parts by weight of one or a mixture of two or more selected from a polyhydric alcohol selected from glycerin, sorbitol, maltitol, and the like, gum arabic, agar, polyvinyl alcohol, and the like, but is not limited thereto.

According to an embodiment of the present invention, when a non-water-soluble polymer such as polyvinylidene fluoride, polytetrafluoroethylene, polyethylene or the like is filled in a capsule instead of a water-soluble polymer, the capsule type moisture absorbent may have a low moisture absorbency, and durability is lower than that in the water-soluble polymer by 50% or more, such that the capsule type moisture absorbent may not be used for a long period of time.

According to an embodiment of the present invention, a viscosity of the capsule outer layer is not limited, but may be 0.1 to 1,000 cp, preferably 0.2 to 500 cp, and in another example, 2 to 400 cp, as measured at 30° C.

According to an embodiment of the present invention, the capsule outer layer may have a uniform thickness, the thickness is not particularly limited, but may be 10 to 1,000 μm, and preferably 100 to 500 μm.

According to an embodiment of the present invention, a moisture absorption rate of the capsule type moisture absorbent may be 0.5 to 15%, preferably 1 to 12%, and in another example, 2 to 10%, as measured preferably at 50° C. and under a relative humidity of 95% for 2 hours. In a case where the moisture absorption rate is in the range as described above, the moisture absorption rate may implement a high moisture absorbency for a long period of time by combination with the first moisture absorbent pack, and may secure a lamp durability through humidity control.

According to an embodiment of the present invention, an internal volume of the capsule type moisture absorbent may be controlled depending on a volume of the moisture absorbent to be sealed inside. As an example, the internal volume may be 0.1 to 20 ml, preferably 0.2 to 10 ml, and in another example, 0.3 to 5 ml, but it is not particularly limited within a range in which implementation of a desired physical property according to embodiments of the present invention is not impaired.

According to an embodiment of the present invention, the moisture absorbent included in the capsule type moisture absorbent may be the same as or different from the moisture absorbent of the powder type moisture absorbent described above. The moisture absorbent described above has excellent moisture absorbency and release resistance and may be formed of various materials without limitation as long as it does not be eluted from the second moisture absorbent pack or does not damage the second moisture absorbent pack.

Preferably, according to an embodiment of the present invention, the capsule type moisture absorbent may include one or a mixture of two or more selected from the group consisting a third inorganic material, a fourth inorganic material, alkali metal phosphate, and a polymer additive. Preferably, the capsule type moisture absorbent may include all a third inorganic material, a fourth inorganic material, alkali metal phosphate, and a polymer additive.

According to an embodiment of the present invention, the third inorganic material may include one or two or more selected from the group consisting of magnesium chloride, calcium chloride, sodium carbonate, sodium phosphate, sodium bicarbonate, sodium citrate, sodium oxalate, and sodium sulfate, but is not limited thereto. Preferably, the third inorganic material may include any one or more selected from magnesium chloride, calcium chloride, and sodium carbonate in terms of improving moisture absorbency. In a case of including the third inorganic material as described above, excellent moisture absorbency may be implemented. In particular, when the third inorganic material is mixed with the fourth inorganic material, the alkali metal phosphate, and the polymer wax, moisture absorbency may be significantly improved, and the moisture absorbent may be prevented from being liquefied due to excessive moisture absorption, such that reliability for product stability may be secured.

According to an embodiment of the present invention, to 70 wt % of the third inorganic material may be included with respect to the total weight of the moisture absorbent. 20 to 60 wt % of the third inorganic material may be preferably included, and 30 to 55 wt % of the third inorganic material may be in another example, included, with respect to the total weight of the moisture absorbent. In a case where the first inorganic material is included in the above-mentioned content, stability of the second moisture absorbent pack may be secured and excellent moisture absorbency and release resistance may be implemented.

According to an embodiment of the present invention, the fourth inorganic material may include one or two or more selected from the group consisting of magnesium oxide and calcium oxide, but is not limited thereto. In a case of including the fourth inorganic material, excellent moisture absorbency and moisture absorption effect may be implemented for a long period of time. In particular, when the fourth inorganic material is mixed with the third inorganic material, the alkali metal phosphate, and the polymer wax, the moisture absorbent may be prevented from being liquefied due to deliquescence after moisture absorption.

According to an embodiment of the present invention, 5 to 50 wt % of the fourth inorganic material, preferably 10 to 50 wt % of the fourth inorganic material, and in another example, 15 to 40 wt % of the fourth inorganic material may be included with respect to the total weight of the moisture absorbent. In a case where the fourth inorganic material is included in the above-mentioned content, sustainability of moisture absorbency may be secured for a long period of time.

According to an embodiment of the present invention, since the alkali metal phosphate is the same as the alkali metal phosphate of the moisture absorbent described above, description of kinds thereof will be omitted. In a case where the capsule type moisture absorbent includes the alkali metal phosphate as described above, since the alkali metal phosphate is combined with other components in the moisture absorbent, it is possible to efficiently suppress expansion that occurs when moisture is absorbed, humidity control performance may be excellent under a high humidity condition, and moisture absorbency may be effectively maintained for a long period of time.

According to an embodiment of the present invention, 1 to 30 wt % of the alkali metal phosphate may be included with respect to the total weight of the moisture absorbent. 2 to 25 wt % of the alkali metal phosphate may be preferably included, and in another example, 5 to 25 wt % of the alkali metal phosphate may be included, with respect to the total weight of the moisture absorbent. In a case where the alkali metal phosphate is included in the above-mentioned content, the expansion rate of the capsule type moisture absorbent may be more decreased when absorbing moisture and excellent absorbency may be secured.

According to an embodiment of the present invention, examples of the polymer additive may include waxes, starches, celluloses, or the like, but is not limited thereto. As an example, the waxes may be one or a mixture of two or more selected from polyethylene wax, polypropylene wax, polyamide wax, carnauba wax, paraffin wax, polytetrafluoroethylene wax, and the like. In addition, the starches may be one or a mixture of two or more selected from starch, hydrolyzed starch, cross-linked starch, modified starch, and the like. The celluloses may be one or a mixture of two or more selected from carboxymethylcellulose, hydroxypropyl cellulose, ethyl cellulose, methyl cellulose, sodium carboxymethylcellulose, cellulose acetate, and the like, but is not limited thereto. In a case of including the polymer additive, the polymer additive is combined with other components in the moisture absorbent, such that increase effect in moisture absorbency and a mechanical physical property may be secured.

According to an embodiment of the present invention, the polymer additive may further include a component such as a polymer coagulant. Specifically, examples of the polymer coagulant may include a sodium 2-propenoate 2-propenamide polymer, but is not limited thereto. Accordingly, a softness property such as a sponge or the like may be imparted to the composite moisture absorbent structure when it absorbs moisture and then expands, and the moisture absorbent may be prevented from being liquefied due to deliquescence after moisture absorption.

According to an embodiment of the present invention, 1 to 40 wt % of the polymer additive, preferably 5 to 30 wt % of the polymer additive, and in another example, 5 to 20 wt % of the polymer additive may be included with respect to the total weight of the moisture absorbent. In a case where the polymer additive is included in the above-mentioned content, moisture absorption rate and a moisture absorption speed may be significantly increased, which may implement excellent moisture absorption sustainability.

Preferably, in order to implement excellent moisture absorbency for a long period of time, the moisture absorbent of the capsule type moisture absorbent may be the same as the moisture absorbent of the powder type moisture absorbent.

Specifically, in order to distinguish the moisture absorbents from each other, as an example, the powder type moisture absorbent of the moisture absorbent may be referred to as a first moisture absorbent and the capsule type moisture absorbent of the moisture absorbent may be referred to as a second moisture absorbent.

According to an embodiment of the present invention, the first moisture absorbent pack and the second moisture absorbent pack may be included at a weight ratio of 1 to 5:1. The first moisture absorbent pack and the second moisture absorbent pack may be preferably included at a weight ratio of 1 to 4:1 and in another example, may be included at a weight ratio of 2 to 4:1. By including the first moisture absorbent pack and the second moisture absorbent pack at the ratio as described above, excellent moisture absorbency may be implemented and a high moisture absorbency may be sustainably implemented for a long period of time, such that a use period of the vehicle lamp may be extended and durability of the vehicle lamp may be secured.

According to an embodiment of the present invention, when the composite moisture absorbent structure is exposed in a thermo-hygrostat at 40° C. and a relative humidity of 90% for 113 days, the time at which a relative humidity of the composite moisture absorbent structure becomes 60% may be 1,800 hours or more, preferably 2,100 to 3,500 hours, and in another example, 2,300 to 3,500 hours. The time as described above means that the composite moisture absorbent structure may implement moisture absorbency for a long period of time, thereby controlling humidity efficiently and implementing significantly excellent durability.

According to an embodiment of the present invention, the composite moisture absorbent structure may be provided in various types for prevention of condensation or moisture removal.

In particular, according to an embodiment of the present invention, the composite moisture absorbent structure has excellent moisture absorbency and the first moisture absorbent pack including the powder type moisture absorbent and the second moisture absorbent pack including the capsule type moisture absorbent are embedded in the composite moisture absorbent structure, such that the composite moisture absorbent structure may control moisture absorbency at a level at which condensation does not occur and may secure sustainability of such a performance for a long period of time.

In a typical moisture absorbent, even if it has excellent initial moisture absorbency, the amount of moisture to be absorbed is significantly reduced over time. Contrastingly, the composite moisture absorbent structure according to embodiments of the present invention has sustainability with respect to a moisture absorption rate. Therefore, the composite moisture absorbent structure may efficiently control humidity in a vehicle lamp.

According to an embodiment of the present invention, the composite moisture absorbent structure may be used for a vehicle lamp.

According to an embodiment of the present invention, in the composite moisture absorbent structure described above, a first moisture absorbent pack and a second moisture absorbent pack may be embedded in a vehicle lamp, which controls humidity in the vehicle lamp. As an example, in the composite moisture absorbent structure according to embodiments of the present invention, both a first moisture absorbent pack and a second moisture absorbent pack are mounted in a dust cover provided in a vehicle lamp, such that an occurrence of condensation may be suppressed by inducing moisture absorption and controlling humidity in a device or humidity in the vehicle lamp may be controlled by inducing moisture absorption in the vehicle lamp.

Specifically, a vehicle lamp in which a first moisture absorbent pack including a powder type moisture absorbent and a second moisture absorbent pack including a capsule type moisture absorbent are embedded may be provided, in which the powder type moisture absorbent is formed of a moisture absorbent including: one or two or more first inorganic materials selected from the group consisting of magnesium chloride, calcium chloride, and sodium carbonate; one or two or more second inorganic materials selected from the group consisting of magnesium oxide and calcium oxide; alkali metal phosphate; and a polymer wax, and the capsule type moisture absorbent includes a moisture absorbent which is the same as or different from the powder type moisture absorbent described above and is filled in a capsule including a water-soluble polymer.

According to an embodiment of the present invention, each of descriptions such as a kind, a content, or the like of the first moisture absorbent pack and the second moisture absorbent pack are the same as those described above, therefore the descriptions thereof will be omitted.

According to an embodiment of the present invention, in the first moisture absorbent pack, a powder type moisture absorbent may be sealed in an air permeable packaging material. In addition, in the second moisture absorbent pack, a capsule type moisture absorbent may also be sealed in an air permeable packaging material. In the composite moisture absorbent structure in which the first moisture absorbent pack and the second moisture absorbent pack are embedded as described above, in a case where the moisture absorbent packs are mounted in the vehicle lamp, moisture absorbency may be controlled at a level at which condensation does not occur in the vehicle lamp and humidity control performance may be maintained for a long period of time.

According to an embodiment of the present invention, the first moisture absorbent pack and the second moisture absorbent pack may be mounted in the vehicle lamp at a weight ratio of 1 to 5:1. The first moisture absorbent pack and the second moisture absorbent pack may be preferably mounted in the vehicle lamp at a weight ratio of 1 to 4:1 and in another example, may be included at a weight ratio of 2 to 4:1. By mounting the first moisture absorbent pack and the second moisture absorbent pack in the vehicle lamp at the ratio as described above, excellent moisture absorbency may be implemented and a high moisture absorbency may be sustainably implemented for a long period of time, such that a use period of the vehicle lamp may be extended and durability of the vehicle lamp may be secured.

According to the vehicle lamp may implement a high initial moisture absorbency as well as a sustainable high moisture absorbency for a long period of time. In addition, condensation in the vehicle lamp may be prevented due to excellent moisture absorbency and a use period of the vehicle lamp may be extended and durability of the vehicle lamp may be secured.

Hereinafter, the present invention will be described in more detail on the basis of Examples and Comparative Examples. However, the following Examples and Comparative Examples are only examples for describing the present invention in more detail, and the present invention is not limited by Examples and Comparative Examples.

Unless otherwise defined, all terms of technical and scientific terms used herein have the same meaning as commonly understood by one of those skilled in the art to which the present invention belongs. The terms used herein are only for effectively describing a certain example rather than limiting the present invention.

Further, unless otherwise stated in the specification, the unit of added materials may be wt %.

[Physical Property Measurement Method]

1. Moisture Absorption Rate

After exposing the moisture absorbent packs manufactured in Examples and Comparative Examples in a thermo-hygrostat at 30° C. and a relative humidity of 80% for 21 days, the moisture absorption rates were measured and calculated by the following Equation 1.

Moisture absorption rate=(Final weight of moisture absorbent pack after exposure for 21 days−Initial weight of moisture absorbent pack)/Initial weight of moisture absorbent pack×10    [Equation 1]

After exposing the moisture absorbent packs manufactured in Examples and Comparative Examples in a thermo-hygrostat at 40° C. and a relative humidity of 90% for 113 days, the moisture absorption rates were measured and calculated by the following Equation 2.

Moisture absorption rate=(Final weight of moisture absorbent pack after exposure for 113 days−Initial weight of moisture absorbent pack)/Initial weight of moisture absorbent pack×100    [Equation 2]

2. Stability

After exposing the moisture absorbent packs or the composite moisture absorbent structures manufactured in Examples and Comparative Examples in a thermo-hygrostat at 30° C. and a relative humidity of 80% for 21 days, product stabilities such as a phase separation and a leakage of contents, damage of a packaging paper, or the like were evaluated with the naked eye.

After exposing the moisture absorbent packs or the composite moisture absorbent structures manufactured in Examples and Comparative Examples in a thermo-hygrostat at 40° C. and a relative humidity of 90% for 113 days, product stabilities such as a phase separation and a leakage of contents, damage of a packaging paper, or the like were evaluated with the naked eye.

o: The stability is excellent if the phase separation of the contents, the leakage of the contents, and the damage of the packaging paper do not occur at all.

x: The stability is not secured if any one of the phase separation of the contents, the leakage of the contents, and the damage of the packaging paper occur.

3. Expansion Rate

After exposing the moisture absorbent pack in a thermo-hygrostat at 30° C. and a relative humidity of 80% for 21 days, a rate of increase in a volume of the moisture absorbent pack was measured based on an initial volume of the moisture absorbent pack.

4. Durability

After mounting the moisture absorbent packs manufactured in Examples and Comparative Examples in a vehicle headlamp, a relative humidity in the lamp was measured under a temperature of 40° C. and a relative humidity of 90% and then the time at which the internal relative humidity reaches 60% was measured.

Examples 1 to 6 and Comparative Example 1

25 g of moisture absorbents obtained by uniformly mixing the components with a mixer according to the composition of the following Table 1 were prepared.

At this time, a mixture of magnesium chloride ($MgCl_2$, Aldrich, purity: 94%) as a first inorganic material, and magnesium oxide (MgO-1, light burned magnesia made in Japan, particle size: 30 μm) and magnesium oxide (MgO-2, dead burned magnesia made in Germany, particle size: 220 μm) as second inorganic materials was used for the moisture absorbents. In addition, alkali metal phosphate ($NaH_2PO_4$ or $KH_2PO_4$, Aldrich, purity: 99%) and polyethylene wax (PE wax, LH1200 produced by SFC Co., Ltd., softening point: 109±3° C.) as a polymer wax were used. After uniformly mixing the components with the mixer according to the content of the composition shown in the following Table 1, the respective moisture absorbents were prepared.

In addition, two air permeable packaging materials of 160 mm×145 mm were prepared, the prepared moisture absorbent was put between the air permeable packaging materials, and then the prepared moisture absorbent was processed using a heat-sealing machine at 120° C., thereby manufacturing a moisture absorbent pack.

At this time, in the air permeable packaging material, a double-layer structure (sealing layer/Tyvek, a thickness of the sealing layer: 5 μm) obtained by applying a hot-melt coating solution (containing 25 wt % of an acrylic latex adhesive (transparent aggregate), 8 wt % of acrylic latex (resin), 8 wt % of a hot-melt adhesive containing ethylene-vinyl acetate resin, wt % of toluene, and 4 wt % of a curing agent, produced by DAGEONG P&C Co., Ltd.) on one surface of a Tyvek film and performing drying, was used.

Example 7

A first moisture absorbent pack was manufactured by sealing 35 g of a powder type moisture absorbent including a moisture absorbent in the air permeable packaging material.

When the first moisture absorbent pack was measured under a temperature of 50° C. and a relative humidity of 90% for 113 days, the moisture absorption rate of the first moisture absorbent pack was 104.6%.

In addition, a second moisture absorbent pack was manufactured by sealing 15 g of a capsule type moisture absorbent including a moisture absorbent in the air permeable packaging material.

At this time, the capsule type moisture absorbent of which a capsule outer layer is formed of gelatin produced by thermoforming collagen, a moisture absorption rate measured under a temperature of 50° C. and a relative humidity of 95% for 2 hours is 12%, and permeability measured for 24 hours is 200 g/m$^2$ was used. The capsule of which the internal volume is 0.5 ml was used. The moisture absorbent was filled in the capsule.

When the second moisture absorbent pack was measured under a temperature of 50° C. and a relative humidity of 90% for 113 days, the moisture absorption rate of the first moisture absorbent pack was 89.9%.

At this time, in the capsule type moisture absorbent and the powder type moisture absorbent, the same kinds and contents were used as in the moisture absorbent in Example 1.

Each two air permeable packaging materials of 160 mm×145 mm were prepared, each of the powder type moisture absorbent and the capsule type moisture absorbent was put between each of the air permeable packaging materials, and then the moisture absorbents were processed using a heat-sealing machine at 120° C., thereby manufacturing the first moisture absorbent pack and the second moisture absorbent pack.

At this time, in the air permeable packaging material, a double-layer structure (sealing layer/Tyvek, a thickness of the sealing layer: 5 μm) obtained by applying a hot-melt coating solution (containing 25 wt % of an acrylic latex adhesive (transparent aggregate), 8 wt % of acrylic latex (resin), 8 wt % of a hot-melt adhesive containing ethylene-vinyl acetate resin, wt % of toluene, and 4 wt % of a curing agent, produced by DAGEONG P&C Co., Ltd.) on one surface of a Tyvek film and performing drying, was used.

Example 8

In Example 7, the first and second moisture absorbent packs were manufactured in the same content of the components of the moisture absorbent as in Example 2.

Example 9

In Example 7, the first and second moisture absorbent packs were manufactured in the same content of the components of the moisture absorbent as in Example 3.

Example 10

In Example 7, the first and second moisture absorbent packs were manufactured in the same content of the components of the moisture absorbent as in Example 4.

Example 11

In Example 7, the first and second moisture absorbent packs were manufactured in the same content of the components of the moisture absorbent as in Example 5.

After mounting the moisture absorbent in a dust cover provided in a vehicle headlamp, physical properties such as a moisture absorption rate of Equation 1, stability of contents, release resistance, an expansion rate, and durability of the moisture absorbent packs according to Examples 1 to 6 and Comparative Example 1 in a thermo-hygrostat were measured by the method described above and the measured results are shown in the following Table 2.

After mounting the first moisture absorbent pack and the second moisture absorbent pack according to Examples 7 to 11 in a dust cover provided in a vehicle headlamp, stability of contents and durability in a thermo-hygrostat were measured by the method described above and the measured results are shown in the following Table 3.

TABLE 1

| Classification | MgCl$_2$ | MgO-1 | MgO-2 | NaH$_2$PO$_4$ | KH$_2$PO$_4$ | PE wax |
|---|---|---|---|---|---|---|
| Example 1 | 40 | 17.5 | 17.5 | 15 | — | 10 |
| Example 2 | 40 | 20 | 20 | 10 | — | 10 |
| Example 3 | 40 | 15 | 15 | 20 | — | 10 |
| Example 4 | 45 | 30 | — | 15 | — | 10 |
| Example 5 | 45 | — | 30 | 15 | — | 10 |
| Example 6 | 40 | 30 | — | — | 15 | 10 |
| Comparative Example 1 | 40 | 40 | — | — | — | 20 |

TABLE 2

| Classification | Moisture absorption rate (%) | Expansion rate (%) | Stability | Durability (hr) |
|---|---|---|---|---|
| Example 1 | 156.5 | 51.4 | ○ | 1,920 |
| Example 2 | 149.6 | 58.3 | ○ | 1,780 |
| Example 3 | 143.1 | 62.7 | ○ | 1,740 |
| Example 4 | 137.4 | 72.7 | ○ | 1,510 |
| Example 5 | 139.8 | 76.5 | ○ | 1,470 |
| Example 6 | 125.1 | 77.1 | ○ | 1,380 |
| Comparative Example 1 | 96.7 | 116.2 | × | 910 |

As shown in the above Table 2, it was confirmed that the moisture absorbent packs manufactured by Examples according to the present invention have significantly excellent moisture absorption rates as compared to Comparative Example 1, and expansion suppression ability due to moisture absorption is effectively improved through a significantly low expansion rate after moisture absorption.

Figure 1:
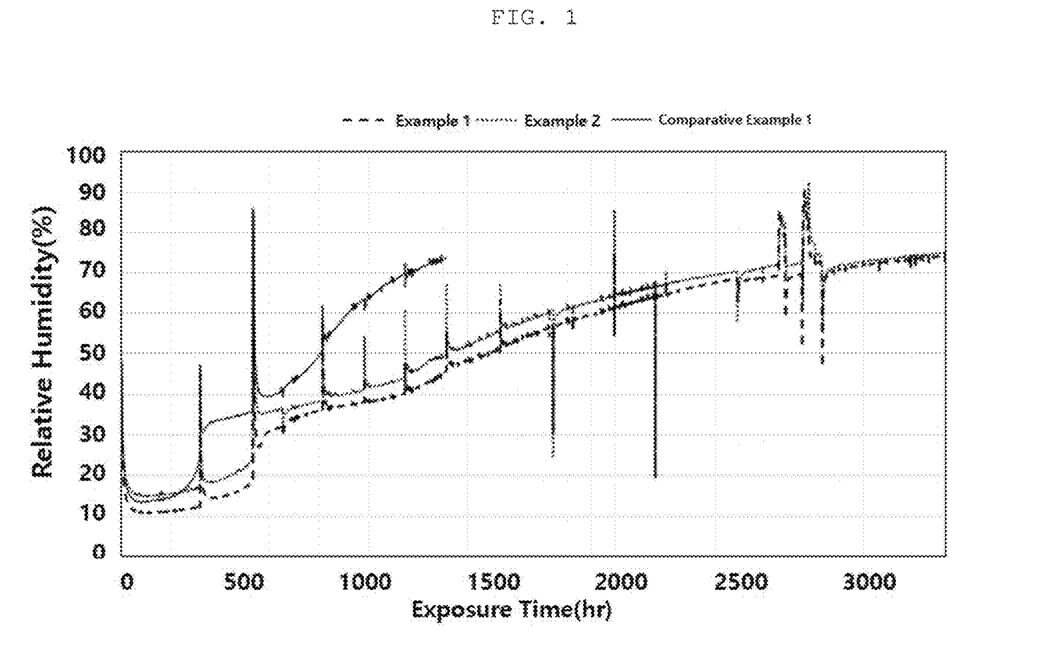
FIG. 1 is a graph illustrating the results of measuring a moisture absorption rate of moisture absorbent packs manufactured by Examples 1 and 2 and Comparative Example 1 according to an embodiment of the present invention.
Figure 2:
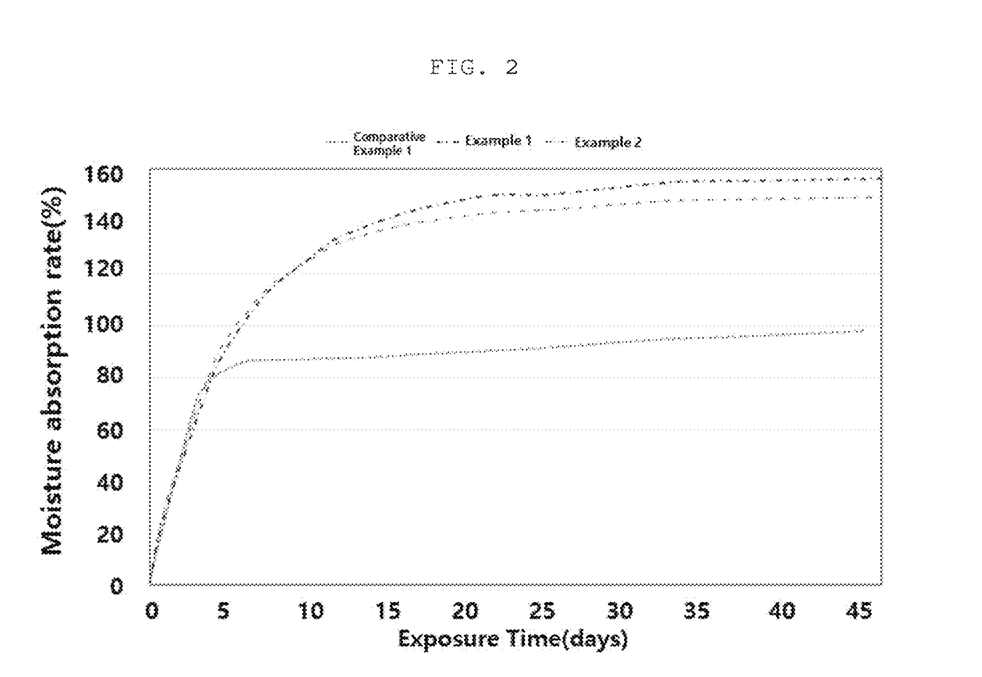
FIG. 2 is a graph illustrating the results of measuring durability of moisture absorbent packs manufactured by Examples 1 and 2 and Comparative Example 1 according to an embodiment of the present invention.

In detail, referring to FIG. 1, it may be more clearly confirmed through the fact that the moisture absorbent packs in Example 1 have a moisture absorption rate of 61.8% and an expansion rate of 51.4% higher than in Comparative Example 1. In addition, when confirming moisture absorption effect for a long period of time, it was confirmed that the moisture absorbent according to embodiments of the present invention has excellent durability for a long period of time through the fact that as illustrated in FIG. 2, in Comparative Example 1, the relative humidity exceeded 60% at 38 days as the humidity rapidly increased; on the other hand, in Examples 1 and 2, the relative humidity was maintained at 60% or less even after 55 days.

Figure 3:
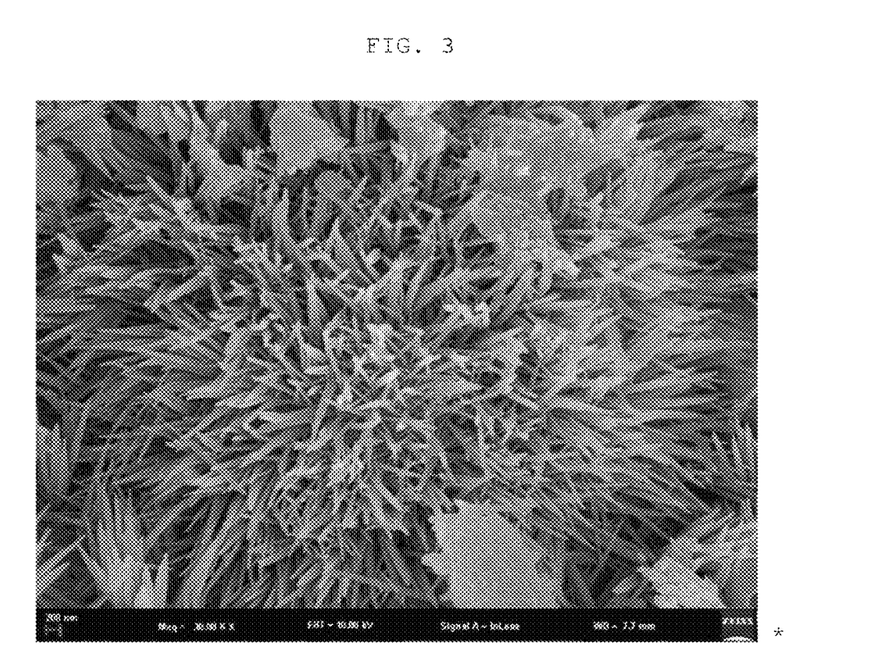
FIG. 3 is an image obtained by observing a moisture absorbent material produced by Example 1 according to an embodiment of the present invention and enlarged 30,000 times with a scanning electron microscope (SEM).
Figure 4:
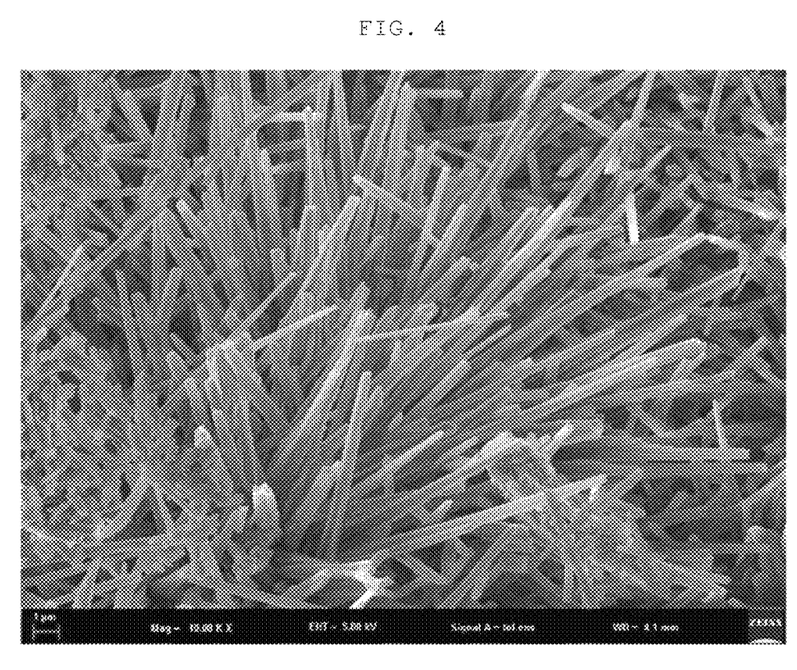
FIG. 4 is an image obtained by observing a moisture absorbent material produced by Comparative Example 1 according to an embodiment of the present invention and enlarged 10,000 times with a scanning electron microscope (SEM).
Figure 5:
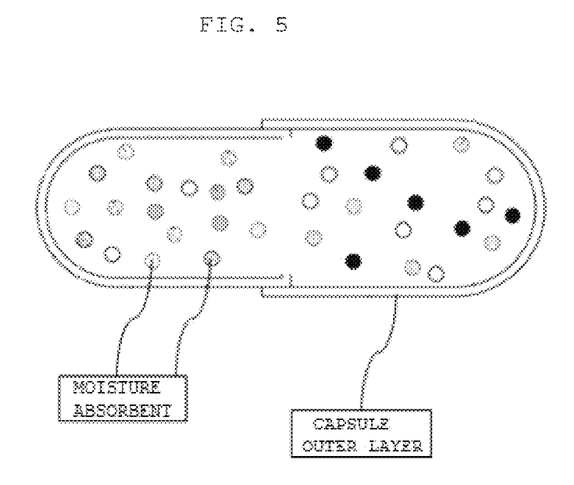
FIG. 5 is a view illustrating a capsule type moisture absorbent included in a second moisture absorbent pack according to an embodiment of the present invention.

Further, in a case of confirming a crystal structure of the moisture absorbent as illustrated in FIGS. 3 and 4, when the moisture absorbent illustrated in FIG. 3 which is prepared by Example 1 is compared to the moisture absorbent illustrated in FIG. 4 which is prepared by Comparative Example 1, it was confirmed that the moisture absorbent prepared by Example 1 may have more improved moisture absorbency since the crystals are densely arranged, and may effectively suppress a volume expansion according to moisture absorption despite of the dense structure.

TABLE 3

| Classification | Composition and content | Stability | Durability (hr) |
|---|---|---|---|
| Example 7 | Powder type first moisture absorbent pack (35 g) + Capsule type second moisture absorbent pack (15 g) | ○ | 2,652 |
| Example 8 | Powder type first moisture absorbent pack (35 g) + Capsule type second moisture absorbent pack (15 g) | ○ | 2,451 |
| Example 9 | Powder type first moisture absorbent pack (35 g) + Capsule type second moisture absorbent pack (15 g) | ○ | 2,383 |
| Example 10 | Powder type first moisture absorbent pack (35 g) + Capsule type second moisture absorbent pack (15 g) | ○ | 2,342 |
| Example 11 | Powder type first moisture absorbent pack (35 g) + Capsule type second moisture absorbent pack (15 g) | ○ | 2,297 |

As shown in Table 3, according to Examples of the present invention, it was confirmed that the composite moisture absorbent structure in which the first moisture absorbent pack which is the same as the moisture absorbents prepared by Examples 1 to 5 and the second moisture absorbent pack including the capsule type moisture absorbent are embedded together has an excellent initial moisture absorption rate, and as a result of testing humidity control when mounted in a vehicle lamp, the composite moisture absorbent structure may maintain humidity control in the vehicle lamp for a long period of time with significantly improved humidity control ability.

According to Examples 7 to 11 of the present invention, it was confirmed that the first moisture absorbent pack and the second moisture absorbent pack are included together, such that the composite moisture absorbent structure has moisture absorbency in the device at a level at which condensation does not occur in the lamp and maintains the moisture absorbent for a long period of time. It was confirmed from such results that the composite moisture absorbent structure may implement moisture absorbency by which condensation does not occur and may sustainably implement a high moisture absorbency for a long period of time, such that a use period of the vehicle lamp may be extended and durability of the vehicle lamp may be secured.

As set forth above, the moisture absorbent pack in which the moisture absorbent is sealed according to embodiments of the present invention may significantly improve moisture absorbency and release resistance and may implement effectively improved durability by overcoming the limitation of the use period.

Further, the moisture absorbent pack in which the moisture absorbent is sealed according to embodiments of the present invention may efficiently suppress expansion according to moisture absorption, such that a volume after the moisture absorption may be significantly reduced as compared to the related art.

Further, the composite moisture absorbent structure may implement sustainable moisture absorbency, resulting in not only efficient suppression in condensation but also an excellent humidity control performance for a long period of time.

The composite moisture absorbent structure according to embodiments of the present invention may have excellent humidity control performance in a case where the first moisture absorbent pack and the second moisture absorbent pack are mounted in the vehicle lamp. Moreover, the composite moisture absorbent structure according to embodiments of the present invention may maintain moisture absorbency for a long period of time by limitedly controlling a moisture absorption speed at a level at which condensation does not occur.

Hereinabove, although a moisture absorbent pack for a vehicle lamp having an improved durability according to embodiments of the present invention has been described by specific matters, they have been provided only for assisting in the entire understanding of the present invention. Therefore, the present invention is not limited to the embodiments. Various modifications and changes may be made by those skilled in the art to which the present invention pertains from this description.

Therefore, the spirit of the present invention should not be limited to these embodiments, but the claims and all of modifications equal or equivalent to the claims are intended to fall within the scope and spirit of the present invention.

What is claimed is:
1. A moisture absorbent comprising:
 a) one or two or more first inorganic materials selected from the group consisting of magnesium chloride, calcium chloride, and sodium carbonate;
 b) one or two or more second inorganic materials selected from the group consisting of magnesium oxide and calcium oxide;
 c) alkali metal phosphate; and
 d) one or two or more polymer waxes selected from the group consisting of polyethylene wax, polypropylene wax, polyamide wax, carnauba wax, paraffin wax, and polytetrafluoroethylene wax,
 wherein the moisture absorbent includes 10 to 70 wt % of the first inorganic material, 5 to 50 wt % of the second inorganic material, 1 to 30 wt % of the alkali metal phosphate, and 1 to 30 wt % of the polymer wax, with respect to a total weight of the moisture absorbent.
2. The moisture absorbent of claim 1, wherein
 the alkali metal phosphate includes one or two or more selected from the group consisting of monosodium phosphate, disodium phosphate, and trisodium phosphate.
3. A moisture absorbent pack for a vehicle lamp in which the moisture absorbent of claim 1 is sealed in an air permeable packaging material.
4. The moisture absorbent pack for a vehicle lamp of claim 3, wherein
 the air permeable packaging material includes an air permeable film layer and a sealing layer formed on one surface or opposite surfaces of the air permeable film layer, the air permeable film layer being formed of one or two or more fibers selected from a natural fiber, polyester, polyethylene, polypropylene, polyamide, a cellulose-based fiber, an acrylic fiber, and a rayon-based fiber.

5. The moisture absorbent pack for a vehicle lamp of claim 3, wherein
the moisture absorbent pack maintains 60% or less of a relative humidity for 55 days or longer under constant temperature and humidity conditions of 40° C. and 90%.

6. A composite moisture absorbent structure in which a first moisture absorbent pack including a powder type moisture absorbent and a second moisture absorbent pack including a capsule type moisture absorbent are embedded, wherein
the powder type moisture absorbent is formed of a moisture absorbent including:
one or two or more first inorganic materials selected from the group consisting of magnesium chloride, calcium chloride, and sodium carbonate;
one or two or more second inorganic materials selected from the group consisting of magnesium oxide and calcium oxide;
alkali metal phosphate; and
one or two or more polymer waxes selected from the group consisting of polyethylene wax, polypropylene wax, polyamide wax, carnauba wax, paraffin wax, and polytetrafluoroethylene wax, and
the capsule type moisture absorbent includes a moisture absorbent which is the same as or different from the moisture absorbent and filled in a capsule including a water-soluble polymer,
wherein the moisture absorbent forming the powder type moisture absorbent includes 10 to 70 wt % of the first inorganic material, 5 to 50 wt % of the second inorganic material, 1 to 30 wt % of the alkali metal phosphate, and 1 to 30 wt % of the polymer wax, with respect to a total weight of the moisture absorbent forming the powder type moisture absorbent.

7. The composite moisture absorbent structure of claim 6, wherein
the first moisture absorbent pack includes the powder type moisture absorbent and the second moisture absorbent pack includes the capsule type moisture absorbent, the powder type moisture absorbent and the capsule type moisture absorbent being sealed in an air permeable packaging material.

8. The composite moisture absorbent structure of claim 6, wherein
a moisture absorption rate is 0.5 to 15% when the capsule type moisture absorbent is measured under a temperature of 50° C. and a relative humidity of 95% for 2 hours.

9. The composite moisture absorbent structure of claim 6, wherein
the water-soluble polymer is one or a mixture of two or more selected from gelatin, starch, polyvinyl alcohol, polyethyleneimine, polyvinylpyrrolidone, polyalkylene oxide, cellulose ether, carboxymethylcellulose, dextrin, methylcellulose, ethylcellulose, hydroxyethylcellulose, hydroxypropylmethylcellulose, a salt thereof, and a copolymer thereof.

10. The composite moisture absorbent structure of claim 6, wherein
the capsule type moisture absorbent includes a moisture absorbent including one or a mixture of two or more selected from a third inorganic material, a fourth inorganic material, alkali metal phosphate, and a polymer additive and filled in the capsule including the water-soluble polymer.

11. The composite moisture absorbent structure of claim 10, wherein
the third inorganic material includes one or two or more selected from the group consisting of magnesium chloride, calcium chloride, sodium carbonate, sodium phosphate, sodium bicarbonate, sodium citrate, sodium oxalate, and sodium sulfate, and the fourth inorganic material includes one or two or more selected from the group consisting of magnesium oxide and calcium oxide.

12. The composite moisture absorbent structure of claim 6, wherein the composite moisture absorbent structure is for a vehicle lamp.

13. The moisture absorbent pack for a vehicle lamp of claim 1, wherein the second inorganic material comprises a second inorganic material $IO_a$ having an average particle size of 1 to 150 μm and a second inorganic material $IO_b$ having an average particle size of 200 to 500 μm.

14. The moisture absorbent pack for a vehicle lamp of claim 13, wherein an average particle size ratio of the second inorganic material $IO_a$ to the second inorganic material $IO_b$ is 0.001 to 0.75:1.

15. The moisture absorbent pack for a vehicle lamp of claim 1, wherein the alkali metal phosphate is $NaH_2PO_4$ or $KH_2PO_4$.

* * * * *